(12) United States Patent
Chang et al.

(10) Patent No.: US 9,787,401 B2
(45) Date of Patent: Oct. 10, 2017

(54) MODE DIVISION MULTIPLEXED PASSIVE OPTICAL NETWORK (MDM-PON) APPARATUS, AND TRANSMISSION AND RECEPTION METHOD USING THE SAME

(71) Applicant: ELECTRONICS AND TELECOMMUNICATIONS RESEARCH INSTITUTE, Daejeon-si (KR)

(72) Inventors: Sun Hyok Chang, Daejeon-si (KR); Kwang Joon Kim, Daejeon-si (KR); Hyun Jae Lee, Daejeon-si (KR); Chan Gyo Han, Daejeon-si (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 15/218,240

(22) Filed: Jul. 25, 2016

(65) Prior Publication Data

US 2017/0070293 A1    Mar. 9, 2017

(30) Foreign Application Priority Data

Sep. 9, 2015 (KR) .................. 10-2015-0127928

(51) Int. Cl.
*H04B 10/27* (2013.01)
*H04B 10/25* (2013.01)
(Continued)

(52) U.S. Cl.
CPC ......... *H04B 10/27* (2013.01); *H04B 10/2504* (2013.01); *H04J 14/08* (2013.01);
(Continued)

(58) Field of Classification Search
None
See application file for complete search history.

(56) References Cited

U.S. PATENT DOCUMENTS

| 2013/0301991 A1 | 11/2013 | Kopp et al. |
| 2014/0086584 A1 | 3/2014 | Mukai et al. |
| 2015/0270920 A1* | 9/2015 | Cavaliere ........... H04B 10/2503 398/44 |

FOREIGN PATENT DOCUMENTS

KR    10-2009-0100083 A    9/2009

OTHER PUBLICATIONS

R. Ryf, et al., "Mode-division multiplexing over 96km of few-mode fiber using coherent 6×6 MIMO processing", Journal of lightwave technology, vol. 30, No. 4, pp. 521-531, Feb. 2012.
(Continued)

*Primary Examiner* — Darren E Wolf
(74) *Attorney, Agent, or Firm* — LRK Patent Law Firm (57) ABSTRACT

A Mode Division Multiplexed Passive Optical Network (MDM-PON) apparatus includes: a non-mode selective multiplexer which includes a first end where three or more single-mode optical fibers are spaced apart from each other by a predetermined distance, and a second end where cores of the three or more single-mode optical fibers are tapered such that a gap between the three or more single-mode optical fibers is narrower than the predetermined distance while the three or more single-mode optical fibers are spaced apart from each other by an equal distance; an optical line terminal (OLT) which is connected to the second end through a few-mode fiber, and transmits a downstream optical signal; and three or more optical network units (ONUs) which is connected to the first end through the three or more single-mode optical fibers, and transmits upstream optical signals.

9 Claims, 10 Drawing Sheets

(51) Int. Cl.
  *H04B 10/2581* (2013.01)
  *H04B 10/2587* (2013.01)
  *H04B 10/272* (2013.01)
  *H04J 14/08* (2006.01)

(52) U.S. Cl.
  CPC .......... *H04B 10/25* (2013.01); *H04B 10/2581* (2013.01); *H04B 10/2587* (2013.01); *H04B 10/272* (2013.01)

(56) References Cited

OTHER PUBLICATIONS

N. Fontaine et al., "Geometric requirements for photonic lanterns in space division multiplexing", Optics Express, vol. 20, No. 24, pp. 27123-27132, Nov. 2012.

* cited by examiner

MODE DIVISION MULTIPLEXED PASSIVE OPTICAL NETWORK (MDM-PON) APPARATUS, AND TRANSMISSION AND RECEPTION METHOD USING THE SAME

CROSS-REFERENCE TO RELATED APPLICATION(S)

This application claims priority to Korean Patent Application No. 10-2015-0127928, filed on Sep. 9, 2015, in the Korean Intellectual Property Office, the entire disclosure of which is incorporated herein by reference for all purposes.

BACKGROUND

1. Field

The following description generally relates to a technology for passive optical communication, and more particularly to a passive optical network apparatus using mode-division multiplexing.

2. Description of the Related Art

A Passive Optical Network (PON) apparatus is composed of an optical line terminal (OLT) of a communication service provider side, an optical network unit (ONU) of a subscriber side, and optical cables and an optical distribution network that connect the OLT and the ONU.

In the Time Division Multiplexing (TDM), which is a multiplexing method used by a passive optical network apparatus, a downstream optical signal, output from an OLT, is split by a passive optical splitter and is transmitted to a plurality of ONUs, while upstream optical signals, output from a plurality of ONUs, are transmitted to the OLT through the passive optical splitter.

However, in the TDM-PON, loss occurs in the optical power splitter and the loss in the optical power splitter increases with a splitting ratio. For example, in the case where an optical signal is split into four branches, a splitting loss of 6 dB or more occurs, and in the case where an optical signal is split into 32 branches, a splitting loss of 15 dB or more occurs. Such loss in the optical power splitter causes many losses, such as a loss of a Feeder line and a loss in a power budget of an OLT/ONU. For this reason, there is a difficulty in increasing the number of subscribers and the length of a Feeder line. Korean Laid-open Patent Publication No. 10-2009-0100083 discloses a passive optical network system, and a method of increasing a signal transmission distance and branching ratio. However, a separate reproducing unit is required in the system.

SUMMARY

Provided is a structure of a passive optical network apparatus, which may reduce the loss in the optical power splitter of a general TDM-PON, particularly solving the problem that loss in the optical power splitter significantly increases with a splitting ratio.

In one general aspect, there is provided a Mode Division Multiplexed Passive Optical Network (MDM-PON) apparatus, including: a non-mode selective multiplexer configured to include a first end where three or more single-mode optical fibers are spaced apart from each other by a predetermined distance, and a second end where cores of the three or more single-mode optical fibers are tapered such that a gap between the three or more single-mode optical fibers is narrower than the predetermined distance while the three or more single-mode optical fibers are spaced apart from each other by an equal distance, wherein the non-mode selective multiplexer outputs, to the second end, an optical signal mode generated by coupling optical signals received at the first end, splits the optical signals received at the second end into a number of the single-mode optical fibers, and outputs the split optical signals to the first end; an optical line terminal (OLT) connected to the second end through a few-mode fiber, and configured to transmit a downstream optical signal; and three or more optical network units (ONUs) connected to the first end through the three or more single-mode optical fibers, and configured to transmit upstream optical signals.

The non-mode selective multiplexer may couple three or more optical signals, received from the three or more OUNs, at the second end regardless of time, may perform mode-division multiplexing of the optical signals, and may output the mode-division multiplexed optical signals to the few mode fiber. Further, the non-mode selective multiplexer may split the downstream optical signal, transmitted from the OLT, into the number of the single-mode optical fibers, and may transmit the split optical signals to the three or more ONUs.

The OLT may include: a mode multiplexer configured to multiplex the mode-division multiplexed optical signals transmitted from the non-mode selective multiplexer; and a digital signal processor configured to perform digital signal processing of the multiplexed optical signals to decode modulated signals to digital signals.

Further, the three or more ONUs may sequentially transmit, to the non-mode selective multiplexer, the upstream optical signals by using a burst mode signal of a time division multiplexing (TDM) scheme. In addition, the three or more ONUs may modulate optical signals generated by a laser diode, and may transmit the modulated optical signals to the non-mode selective multiplexer through the single-mode optical fibers.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

Hereinafter, exemplary embodiments of the present disclosure will be described with reference to the accompanying drawings. In the following description, terms used throughout this specification are defined in consideration of the functions according to exemplary embodiments, and can be varied according to a purpose of a user or manager, or precedent and so on. Unless otherwise defined, all technical and scientific terms used herein have the same meaning as is commonly understood by one of skill in the art to which this invention belongs at the time of filing. If specifically defined, then the meanings of the terms used in the following embodiments shall follow the definitions.

Figure 1:
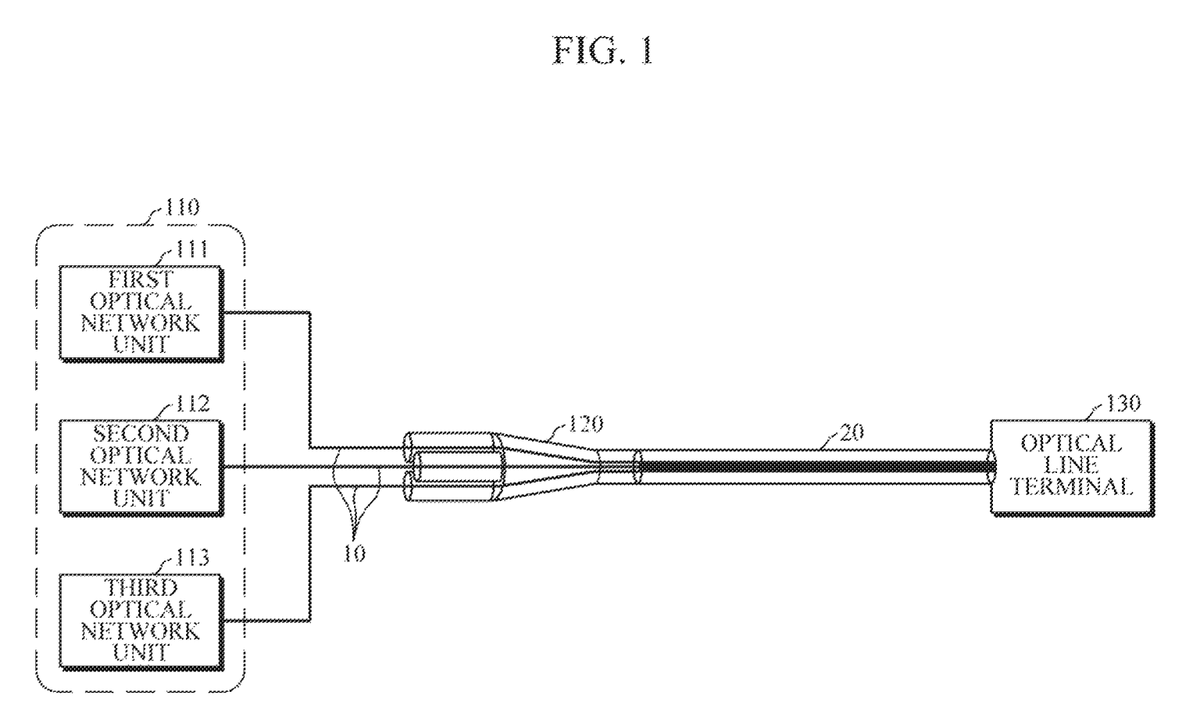
FIG. 1 is a diagram illustrating an example of a Mode Division Multiplexed Passive Optical Network (MDM-PON) apparatus according to an exemplary embodiment.

FIG. 1 is a diagram illustrating an example of a Mode Division Multiplexed Passive Optical Network (MDM-PON) apparatus 100 according to an exemplary embodiment.

Referring to FIG. 1, the MDM-PON apparatus 100 includes three or more optical network units (ONUs) 110, a non-mode selective multiplexer 10, and an optical line terminal (OLT) 130.

The non-mode selective multiplexer 120 is composed of three or more single-mode optical fibers or three or more single mode cores. The non-mode selective multiplexer 120 has one end where the three or more single-mode optical fibers are spaced apart from each other at a predetermined distance. Hereinafter, the one end is referred to as a first end. At the other end of the non-mode selective multiplexer 120, the single-mode optical fibers are tapered in an opposite direction of the first end, such that a gap between the single-mode optical fibers is narrower than the predetermined distance, while the single-mode optical fibers are spaced apart from each other by an equal distance. Hereinafter, the other end is referred to as a second end. No coupling occurs between optical signals passing through the single-mode optical fibers spaced apart from each other by a predetermined distance.

In the case where the single-mode optical fibers are tapered such that a gap between the single-mode optical fibers is narrower than the predetermined distance, coupling occurs between optical signals, each passing through different single-mode optical fibers. Particularly, in the case where three single-mode optical fibers are tapered while maintaining an equal distance between the single-mode optical fibers (in this case, the three single-mode optical fibers form a regular triangle), optical signals of different single-mode optical fibers are coupled, such that an optical signal mode is generated, which is similar to a mode generated by mode division multiplexing.

While most of the optical power of an optical signal is confined to a core, the optical power has a shape of mode that is dispersed to the outside of the core on an interface between the core and a cladding. Accordingly, in the case where a gap between cores is narrowed as in the case of the tapered second end, a shape of mode is changed when there is another core nearby, and when three cores are located close to each other, an optical signal may not be confined to a core. That is, significant coupling occurs between cores at the second end.

Three or more optical network units (ONUs) 110 are installed on subscriber side, and are connected to the first end of the non-mode selective multiplexer 120 through the single-mode optical fibers. The ONU 110 modulates an optical signal output from a laser diode, and transmits the modulated optical signal to the first end of the non-mode selective multiplexer 120 through a single-mode optical fiber. Further, the ONU 110 receives an optical signal from the optical line terminal (OLT) 130 through the non-mode selective multiplexer 120.

The optical line terminal (OLT) 130 is installed on provider side, and is connected to the second end of the non-mode selective multiplexer 120 through a few-mode fiber. That is, the OLT 130 is connected to the three or more single-mode optical fibers, which are close to each other with an equal distance therebetween, through a few-mode fiber.

In the non-mode selective multiplexer 120, if an optical signal is input to any one of the three or more single-mode optical fibers of the first end that are spaced apart from each other, that is, if any one of the three or more ONUs 110 transmits an optical signal to the non-mode selective multiplexer 120 through a single-mode optical fiber, an output at the second end, which is tapered with optical fibers being spaced apart from each other by an equal distance, is obtained by linear combination of three modes LP01, LP11a, and LP11 of mode division multiplexing. That is, optical power is uniformly distributed over three single-mode optical fibers of the first end.

By contrast, in the case where optical power is input to a few-mode optical fiber, that is, an optical signal is transmitted to the non-mode selective multiplexer 120 through a few-mode optical fiber, the optical signal is split into three or more single-mode optical fibers by the non-mode selective multiplexer 120. In this case, the power ratio is uniformly 1/n, and n represents the number of single-mode optical fibers.

As illustrated in FIG. 1, three ONUs 110 and one OLT 130 are connected through the non-mode selective multiplexer 120. FIG. 1 illustrates division of a downstream optical signal by using the non-mode selective multiplexer 120 instead of an optical power splitter of the Passive Optical Network (PON), and a few-mode optical signal 20 is used instead of a feeder line.

The non-mode selective multiplexer 120 includes 1×N ports to multiplex or demultiplex N number of modes. Further, the few-mode optical fiber 20 is an optical fiber that supports N number of modes. As illustrated in FIG. 1, the non-mode selective multiplexer 120 includes 1×3 ports to multiplex or demultiplex three modes, and the few-mode optical fiber 20 is an optical fiber that supports three modes.

In the general PON, a downstream optical signal is split by a passive optical splitter and is broadcast to all the ONUs, so that the same signal may be transmitted, and the ONUs select their respective signals, and receive the selected signals. In the present disclosure, the downstream optical signal, received from the OLT 130 through the few-mode optical fiber 20, is split into three ports through the non-mode selective multiplexer 120, to be transmitted to each OLT 111, 112, and 113 through the single-mode optical fiber 10. In this case, the power ratio of the optical signal, split into three ports, is uniformly ⅓, and loss occurring while the optical signal, transmitted from the non-mode selective multiplexer 120 to the few-mode optical fiber 20, is split into three or more optical signals is nearly 0 in theory.

Further, an upstream optical signal, transmitted from each OLT 110, is transmitted to the non-mode selective multiplexer 120 through the single-mode optical fiber 10. Then, the non-mode selective multiplexer 120 couples optical signals transmitted to each single-mode optical fiber 10, and transmits the coupled optical fibers in a predetermined shape of mode to the OLT 130 through the few-mode optical fiber 20. In the exemplary embodiment, the first ONU 111 to the third ONU 113 may sequentially transmit the upstream optical signals one by one to the non-mode selective multiplexer 120 by using a time-division multiplexing (TDM) scheme according to the types of OLT 130. In addition, the first ONU 111 to the third ONU 113 may transmit the upstream optical signals at the same time to the non-mode selective multiplexer 120 according to the types of OLT 130. The transmission of optical signals will be described further with reference to FIGS. 4A, 4B, and 5.

Figure 2:
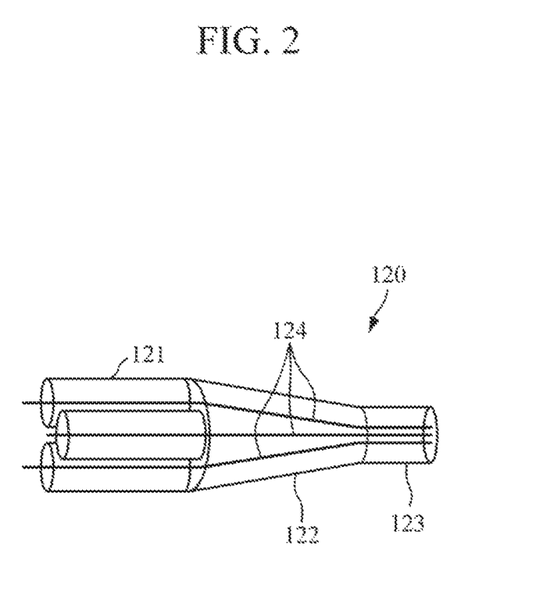
FIG. 2 is a diagram illustrating an example of a non-mode selective multiplexer of an MDM-PON apparatus according to an exemplary embodiment.

FIG. 2 is a diagram illustrating an example of a non-mode selective multiplexer 120 of an MDM-PON apparatus according to an exemplary embodiment.

Referring to FIGS. 1 and 2, in the general mode division multiplexing system, a mode multiplexer is a mode selective multiplexer, while the present disclosure provides the non-mode selective multiplexer 120. The non-mode selective multiplexer 120 includes a first end 121, a tapered portion 122, and a second end 123. At the first end 121, three or more single-mode optical fibers are spaced apart from each other by a predetermined distance so as to be separated from each other. A space between the single-mode optical fibers is a distance that does not cause coupling between cores 124 of the single-mode optical fibers. The first end 121 may be composed of three or more single-mode optical fibers, in which three or more different single-mode cores may be spaced apart from each other by a predetermined distance. The single-mode optical fibers of the first end 121 are connected to the respective ONUs 110 through the single-mode optical fiber 10.

The diameter of a general single-mode optical fiber is 125 um. Accordingly, in the case where the distance between the single-mode optical fibers, constituting the first end 121, is 125 um or more, coupling does not occur between signals in cores. By contrast, in the case where the single-mode optical fibers (cores) at the second end 123 are positioned close to each other, with a distance between the single-mode optical fibers (cores) being 5 um or less, coupling occurs between optical signals passing through cores.

The tapered portion 122 is connected with the first end 121, in which the tapered portion 122 is tapered from the first end 121 to the second end 123 while a gap between the single-mode cores 123 is gradually narrowed. Further, the narrower end of the tapered portion 122 is connected with the second end 123. At the second end 123, three or more single-mode cores 124 are spaced apart from each other by a predetermined distance (in this case, three single-mode cores form a regular triangle), such that coupling occurs between optical signals passing through the single-mode cores 124. Due to the coupling caused by a structure of the single-mode cores 124 of the second end 123, an optical signal has a specific shape of an optical signal mode. An optical signal mode, which is generated by the structure of the single-mode cores 124 of the second end 123, may be directly connected to the few-mode optical fiber 20 by adjusting a numerical aperture of the second end 123.

Once any one of the ONUs 110 transmits an optical signal to the first end 121, that is, one input of a single-mode optical fiber is transmitted to the non-mode selective multiplexer 120, the output at the second end 123 is obtained by linear combination of three modes LP01, LP11*a*, and LP11 of mode division multiplexing. That is, optical power is uniformly distributed over three single-mode optical fibers of the first end.

Once an optical signal is transmitted through the non-mode selective multiplexer 120 through the few-mode optical fiber 20, the second end 123, which is connected to the few-mode optical fiber 20, splits the optical signal into the number of single-mode optical fibers, and transmits the split optical signals to each single-mode optical fiber, in which the power ratio is uniformly 1/n, and n represents the number of single-mode optical fibers.

Loss occurring while the optical signal, transmitted from the mode selective multiplexer 120 to the few-mode optical fiber 20, is split into three or more optical signals is nearly 0 in theory. In a general optical power splitter, loss in the splitting process significantly increases with a splitting ratio. For example, in the case where an optical signal is split into four branches, a splitting loss of 6 dB or more occurs, and in the case where an optical signal is split into 32 branches, a splitting loss of 15 dB or more occurs. However, the non-mode selective multiplexer 120 of the present disclosure rarely causes such loss, thereby efficiently increasing the number of subscribers and a length of a Feeder line.

Figure 3:
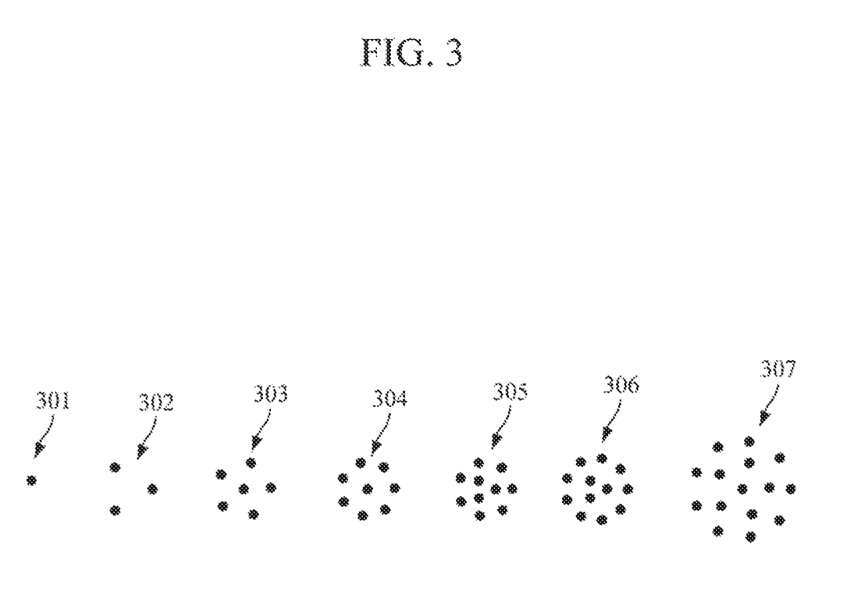
FIG. 3 is a diagram illustrating various examples of a single mode core of a non-mode selective multiplexer according to an exemplary embodiment.

FIG. 3 is a diagram illustrating various examples of a single mode core of a non-mode selective multiplexer 120 according to an exemplary embodiment.

The non-mode selective multiplexer 120 is described above with an example of three single-mode optical fibers or three single-mode cores as illustrated in FIGS. 1 and 2. However, the number of single-mode cores is not limited to three, and the single mode cores may be spaced apart from each other by an equal distance in various manners. FIG. 3 illustrates cross-sectional images of the second end 123 where single-mode cores are disposed, the number of which is 1, 3, 6, 8, 10, 12, and 15. In the case of using three single-mode cores, a regular triangle 302 is formed with three single-mode cores being spaced apart from each other by an equal distance. Then, with the number of single-mode cores increasing to 6, 8, 10, 12, and 15, the single-mode cores, which are spaced apart from each other by an equal distance, form shapes 303 to 307 respectively, as illustrated in FIG. 3.

Figure 4A:
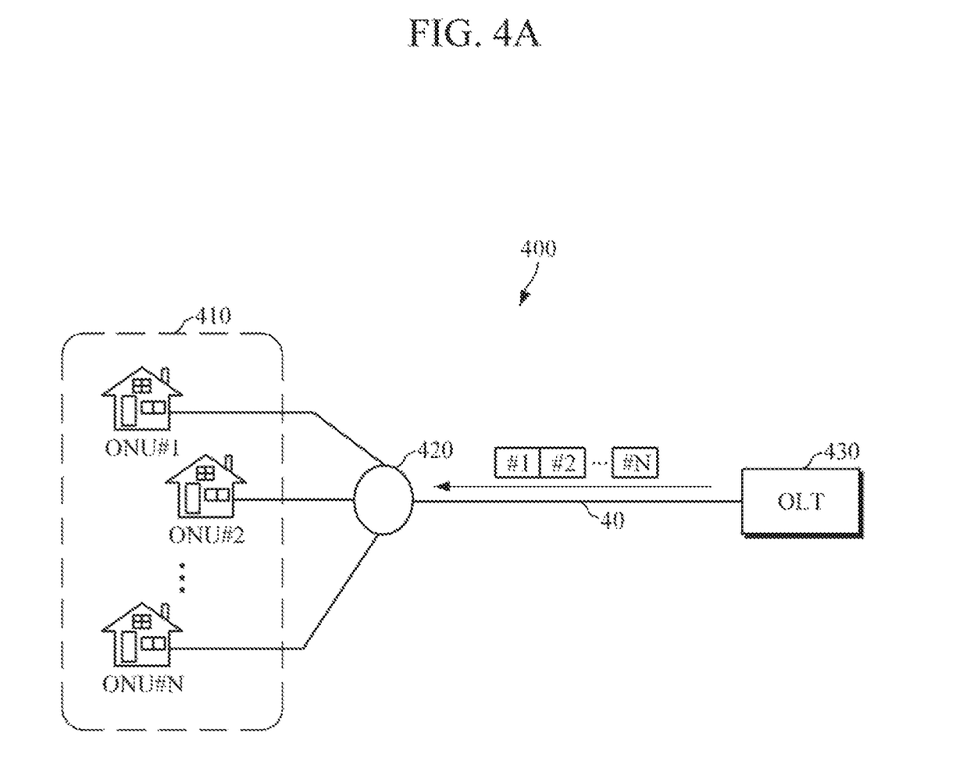
FIG. 4A is a diagram explaining transmission of a downstream optical signal by an MDM-PON apparatus according to an exemplary embodiment.

FIG. 4A is a diagram explaining transmission of a downstream optical signal by an MDM-PON apparatus 100 according to an exemplary embodiment.

Referring to FIG. 4A, the MDM-PON apparatus 100 uses a non-mode selective multiplexer 420 instead of an optical power splitter of a general passive optical network. The non-mode selective multiplexer 420 includes 1×N ports to multiplex or demultiplex N number of modes. Further, a few-mode optical fiber 40 is an optical fiber that supports N number of modes. In the present disclosure, the OLT 430 transmits a downstream optical signal to the non-mode selective multiplexer 420 through the few-mode optical fiber 40. Then, upon receiving the downstream optional signal, the non-mode selective multiplexer 420 splits the received downstream optical signal into N number of ports, and transmits the split optical signals to the ONU 410.

Figure 4B:
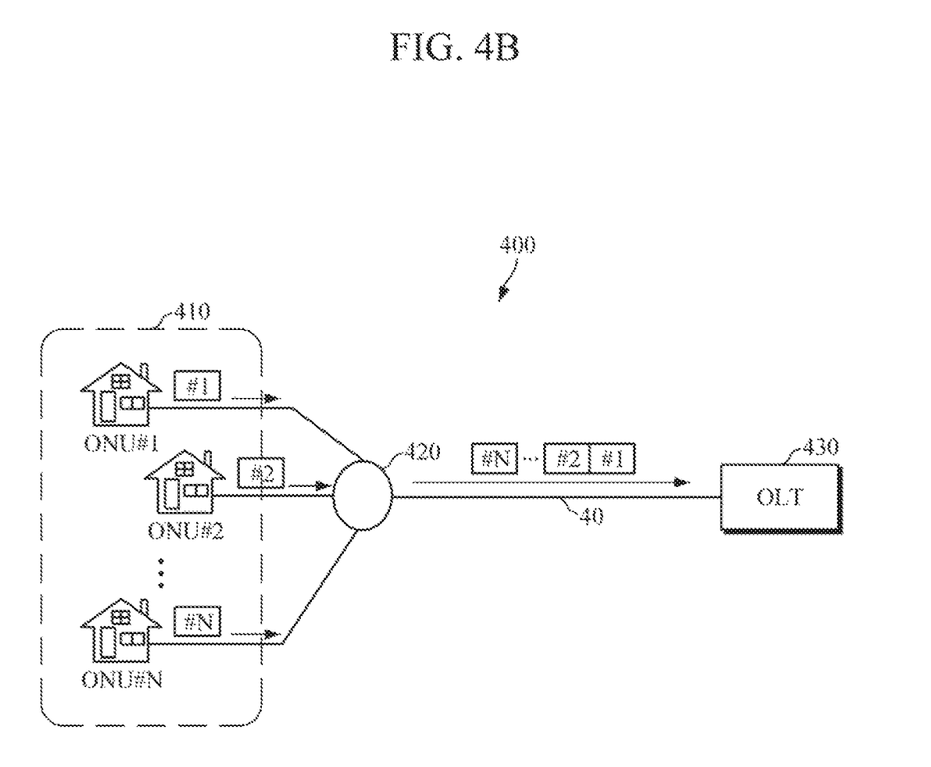
FIG. 4B is a diagram explaining transmission of an upstream optical signal by an MDM-PON apparatus according to an exemplary embodiment.

FIG. 4B is a diagram explaining transmission of an upstream optical signal by the MDM-PON apparatus 100 according to an exemplary embodiment.

Referring to FIG. 4B, in the transmission of an upstream optical signal, a burst mode signal of a time division multiplexing (TDM) scheme is used to prevent crosstalk between modes. In order to transmit upstream optical signals, three or more ONUs 410 may sequentially transmit burst mode signals one by one to the non-mode selective multiplexer 420 by using a time-division multiplexing (TDM) scheme. Then, upon receiving an optical signal at the non-mode selective multiplexer 420 through any one single-mode optical fiber, burst mode signals, obtained by linear combination of three modes LP01, LP11a, and LP11 of mode division multiplexing, form a burst sequence in the few-mode optical fiber 40 which is a feeder line. In this case, time division is divided by dynamic bandwidth allocation.

As described above, the loss in the non-mode selective multiplexer 420 is nearly 0 in theory, such that the loss occurring when passing through the non-mode selective multiplexer 420 is very small. The optical power of a downstream optical signal is split into 1/N, while the optical power of an upstream optical signal is all input to the few-mode optical fiber 40, such that almost no loss occurs. Accordingly, the length of the feeder line may be increased, and the number of connected ONUs 410 may also be increased, thereby increasing the number of subscribers.

Figure 5:
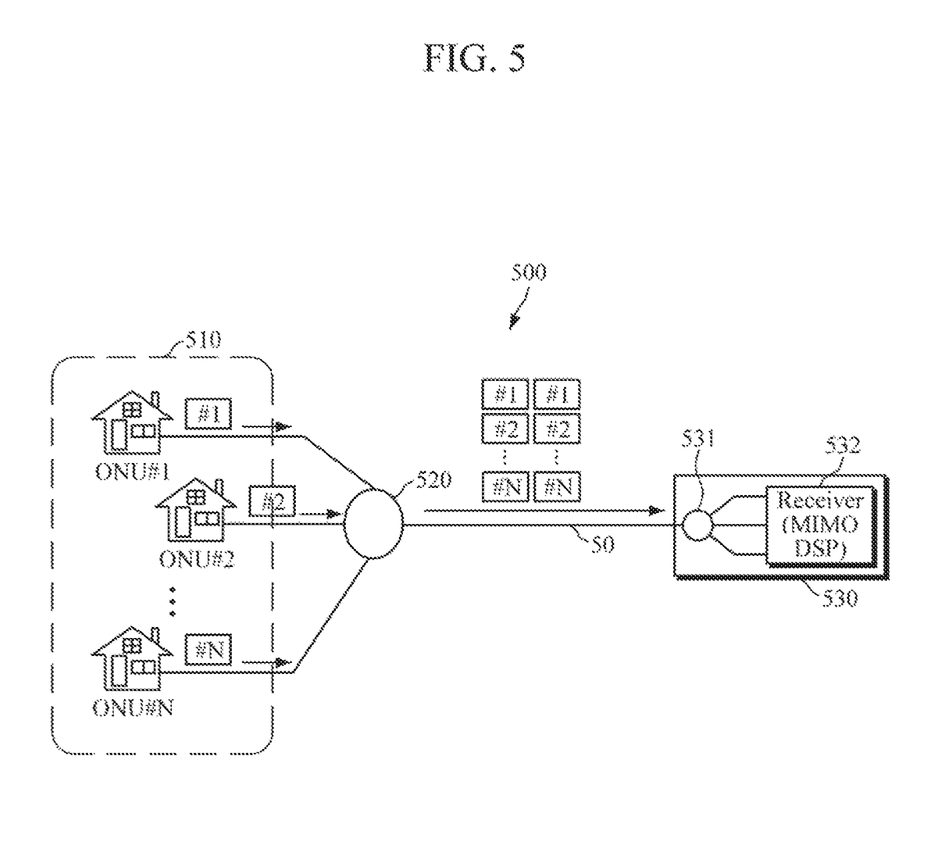
FIG. 5 is a diagram illustrating another example of an MDM-PON apparatus according to an exemplary embodiment.

FIG. 5 is a diagram illustrating another example of an MDM-PON apparatus 500 according to an exemplary embodiment.

Referring to FIG. 5, the MDM-PON apparatus 500 includes three or more ONUs 510 that may transmit upstream optical signals at the same time without using time-division multiplexing. More specifically, while FIG. 4B illustrates the use of time division multiplexing to prevent crosstalk between modes, FIG. 5 illustrates transmission of an upstream optical signal by using mode-division multiplexing. In FIG. 5, three or more ONUs 510 may transmit optical signals regardless of time, and optical signals of the ONUs 510 may be transmitted by using various modes in the feeder line.

An OLT 530 includes a mode multiplexer 531 and a digital signal processor 532 to receive, from a non-mode selective multiplexer 520, optical signals which is in the form of mode-division multiplexing and are transmitted through the few-mode optical fiber 50. The OLT 530 multiplexes the optical signals received in the form of mode-division multiplexing, and the digital signal processor 532, which has a Multiple Input Multiple Output (MIMO) function, performs digital signal processing of the optical signals. The transmission of upstream optical signals illustrated in FIG. 5 may substantially increase a transmission capacity.

Figure 6:
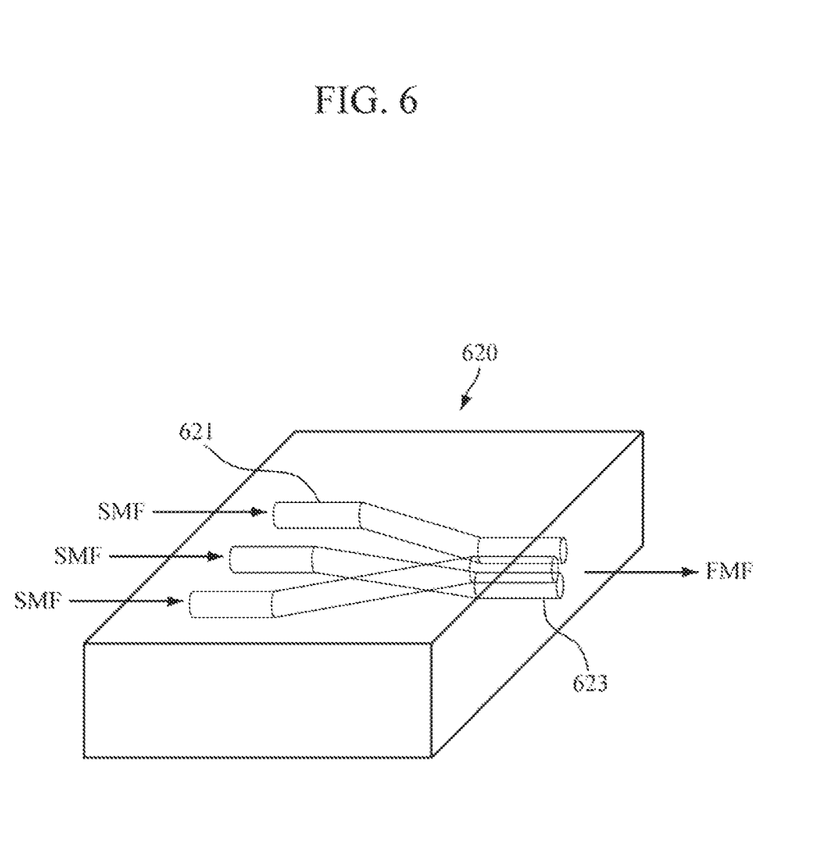
FIG. 6 is a diagram illustrating another example of a non-mode selective multiplexer of an MDM-PON apparatus according to an exemplary embodiment.

FIG. 6 is a diagram illustrating another example of a non-mode selective multiplexer 620 of an MDM-PON apparatus according to an exemplary embodiment.

Referring to FIG. 6, the MDM-PON apparatus may be formed to have tapered cores of single-mode optical fibers as illustrated in FIGS. 1 and 2, or may be formed in the same manner as the non-mode selective multiplexer 620 of FIG. 6. The non-mode selective multiplexer 620 of FIG. 6 may be configured by using a three-dimensional waveguide which is formed by partly changing a refractive index of glass or crystal by using an ultrafast laser inscription method. A second end 623 of the non-mode selective multiplexer 620 is formed with three or more single-mode cores that are spaced apart from each other by an equal distance, as illustrated in FIGS. 1 and 2.

Figure 7:
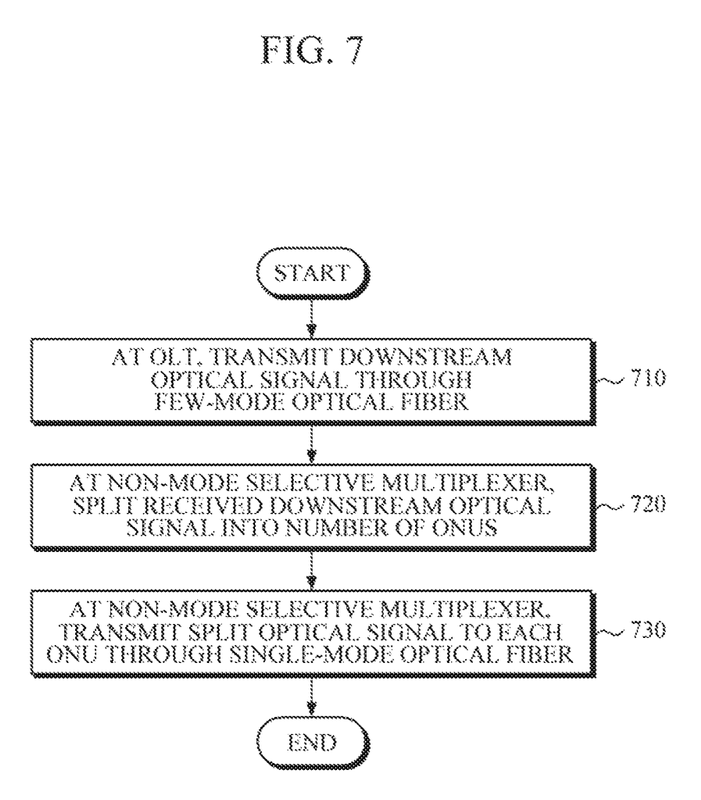
FIG. 7 is a flowchart illustrating an example of a method of transmitting a downstream optical signal by an MDM-PON apparatus according to an exemplary embodiment.

FIG. 7 is a flowchart illustrating an example of a method of transmitting a downstream optical signal by an MDM-PON apparatus according to an exemplary embodiment.

Referring to FIGS. 4A and 7, in the method of transmitting a downstream optical signal by the MDM-PON apparatus 400, the OLT 430 transmits a downstream optical signal to the non-mode selective multiplexer 420 through the few-mode optical fiber 40 in 710. Further, the non-mode selective multiplexer 420 splits the received downstream optical signal into a predetermined number (or the number of ONUs) in 720, and transmits the split optical signals to the respective ONUs 410 through single-mode optical fibers in 730. Optical power is split into a number of ONUs, such that the power ratio of a downstream optical signal transmitted to the ONU 410 may be uniform. In this manner, loss occurring while the downstream optical signal is split may be reduced.

Figure 8:
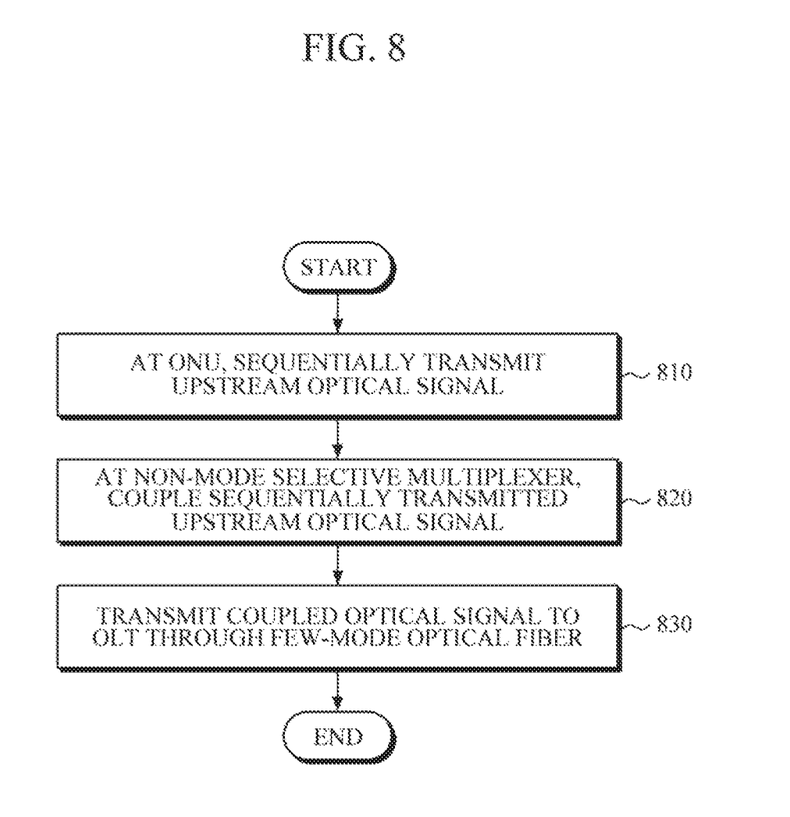
FIG. 8 is a flowchart illustrating an example of a method of transmitting an upstream optical signal by an MDM-PON apparatus according to an exemplary embodiment.

FIG. 8 is a flowchart illustrating an example of a method of transmitting an upstream optical signal by an MDM-PON apparatus according to an exemplary embodiment.

Referring to FIGS. 4B and 8, in the method of transmitting a downstream optical signal by the MDM-PON apparatus 400, ONUs 410 sequentially transmit upstream optical signals one by one to the non-mode selective multiplexer 420 in 810. Three or more ONUs 410 transmit upstream optical signals to the non-mode selective multiplexer 420 by using a burst mode signal of a TDM scheme to prevent crosstalk between modes. Then, the non-mode selective multiplexer 420 couples the sequentially transmitted upstream optical signals in 820, and transmits the coupled optical signals to the OLT 430 through the few-mode optical fiber 40 in 830. Upon receiving an optical signal at the non-mode selective multiplexer 420 through any one single-mode optical fiber, burst mode signals, obtained by linear combination of three modes LP01, LP11a, and LP11 of mode division multiplexing, form a burst sequence in the few-mode optical fiber 40 which is a feeder line. In this case, time division is divided by dynamic bandwidth allocation.

Figure 9:
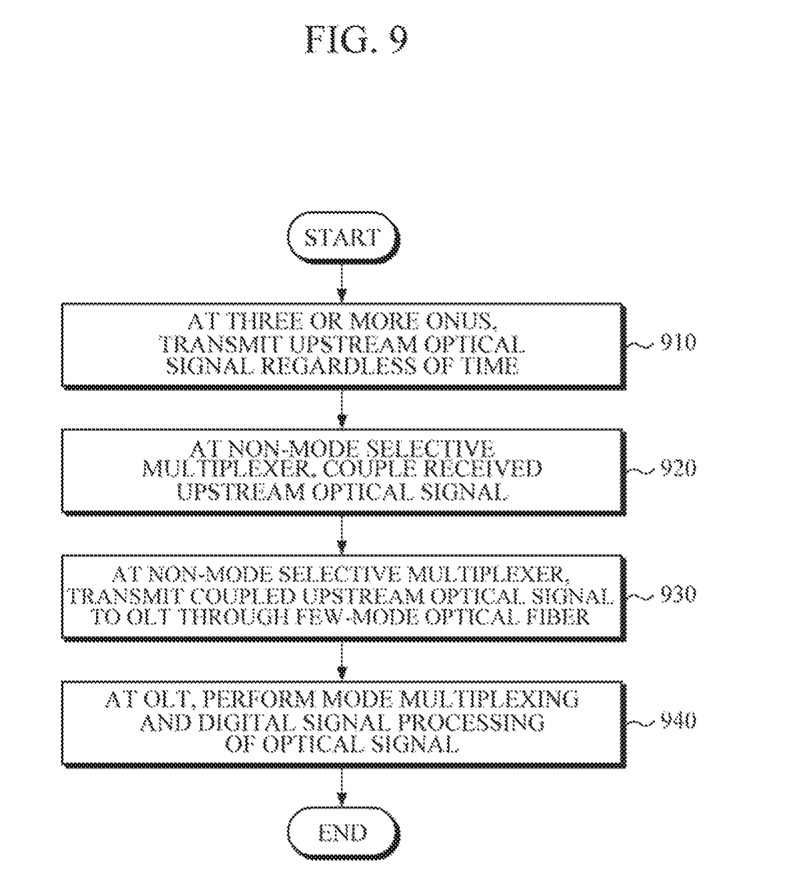
FIG. 9 is a flowchart illustrating another example of a method of transmitting an upstream optical signal by an MDM-PON apparatus according to an exemplary embodiment.

FIG. 9 is a flowchart illustrating another example of a method of transmitting an upstream optical signal by an MDM-PON apparatus according to an exemplary embodiment.

Referring to FIGS. 5 and 9, in the method of transmitting an upstream optical signal by the MDM-PON apparatus 500, three or more ONUs 510 transmit upstream optical signals at the same time without using Time Division Multiplexing. The three or more ONUs 510 transmit upstream optical signals to the non-mode selective multiplexer 520 regardless of time by using single-mode optical fibers in 910. Then, the non-mode selective multiplexer 520 couples the received upstream optical signals having a similar core structure in 920, and transmits the coupled upstream optical signals to the OLT 530 through the few-mode optical bier in 930. The optical signals, which are coupled by the non-mode selective multiplexer 520 and received in the form of mode-division multiplexing, are multiplexed by the OLT 530 through the mode multiplexer 531, and the digital signal processor 532, which has a Multiple input Multiple Output (MIMO) function, performs digital signal processing of the optical signals in 940, thereby substantially increasing a transmission capacity.

The present disclosure provides the Mode Division Multiplexed Passive Optical Network (MDM-PON), and a transmission and reception method using the same, in which loss occurring while an optical signal is split may be minimized, such that the number of subscribers and the transmission distance may be increased. Further, by converting a receiving end of an optical line terminal into a mode-division multiplexed signal receiver, a transmission capacity may be substantially increased, thereby readily solving the problem of a transmission capacity of a subscriber network.

A number of examples have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims. Further, the above-described examples are for illustrative explanation of the present invention, and thus, the present invention is not limited thereto.

What is claimed is:

1. A Mode Division Multiplexed Passive Optical Network (MDM-PON) apparatus, comprising:
    a non-mode selective multiplexer configured to comprise a first end where three or more single-mode optical fibers are spaced apart from each other by a predetermined distance, and a second end where cores of the three or more single-mode optical fibers are tapered such that a gap between the three or more single-mode optical fibers is narrower than the predetermined distance while the three or more single-mode optical fibers are spaced apart from each other by an equal distance, wherein the non-mode selective multiplexer outputs, to the second end, an optical signal mode generated by coupling optical signals received at the first end, splits the optical signals received at the second end into a number of the single-mode optical fibers, and outputs the split optical signals to the first end;
    an optical line terminal (OLT) connected to the second end through a few-mode fiber, and configured to transmit a downstream optical signal; and
    three or more optical network units (ONUs) connected to the first end through the three or more single-mode optical fibers, and configured to transmit upstream optical signals.

2. The apparatus of claim 1, wherein the non-mode selective multiplexer couples three or more optical signals, received from the three or more ONUs, at the second end regardless of time, performs mode-division multiplexing of the optical signals, and outputs the mode-division multiplexed optical signals to the few-mode optical fiber.

3. The apparatus of claim 2, wherein the OLT comprises:
    a mode multiplexer configured to multiplex the mode-division multiplexed optical signals transmitted from the non-mode selective multiplexer; and
    a digital signal processor configured to perform digital signal processing of the multiplexed optical signals to decode modulated signals to digital signals.

4. The apparatus of claim 1, wherein the non-mode selective multiplexer splits the downstream optical signal, transmitted from the OLT, into the number of the single-mode optical fibers, and transmits the split optical signals to the three or more ONUs.

5. The apparatus of claim 1, wherein the three or more ONUs sequentially transmit, to the non-mode selective multiplexer, the upstream optical signals by using a burst mode signal of a time division multiplexing (TDM) scheme.

6. The apparatus of claim 1, wherein the three or more ONUs modulate optical signals generated by a laser diode, and transmit the modulated optical signals to the non-mode selective multiplexer through the single-mode optical fibers.

7. A method of transmitting a downstream optical signal by using a Mode Division Multiplexed Passive Optical Network (MDM-PON) apparatus, the method comprising:
    at an optical line terminal (OLT), transmitting a downstream optical signal through a few-mode optical fiber;
    at a non-mode selective multiplexer, splitting the received downstream optical signal into a number of optical network units (ONUs), wherein the non-mode selective multiplexer is configured to comprise a first end where three or more single-mode optical fibers are spaced apart from each other by a predetermined distance, and a second end where cores of the three or more single-mode optical fibers are tapered such that a gap between the three or more single-mode optical fibers is narrower than the predetermined distance while the three or more single-mode optical fibers are spaced apart from each other by an equal distance, and wherein the non-mode selective multiplexer outputs, to the second end, an optical signal mode generated by coupling optical signals received at the first end, splits the optical signals received at the second end into a number of the single-mode optical fibers, and outputs the split optical signals to the first end; and
    at the non-mode selective multiplexer, transmitting the split optical signals to each of the ONUs through single-mode optical fibers.

8. A method of transmitting an upstream optical signal by using a Mode Division Multiplexed Passive Optical Network (MDM-PON) apparatus, the method comprising:
    at one optical network unit (ONU) after another, sequentially transmitting upstream optical signals;
    at a non-mode selective multiplexer, coupling the sequentially received upstream optical signals, wherein the non-mode selective multiplexer is configured to comprise a first end where three or more single-mode optical fibers are spaced apart from each other by a predetermined distance, and a second end where cores of the three or more single-mode optical fibers are tapered such that a gap between the three or more single-mode optical fibers is narrower than the predetermined distance while the three or more single-mode optical fibers are spaced apart from each other by an equal distance, and wherein the non-mode selective multiplexer outputs, to the second end, an optical signal mode generated by coupling optical signals received at the first end, splits the optical signals received at the second end into a number of the single-mode optical fibers, and outputs the split optical signals to the first end; and
    at the non-mode selective multiplexer, transmitting the coupled upstream optical signals to an optical line terminal (OLT) through a few-mode optical fiber.

9. A method of transmitting an upstream optical signal by using a Mode Division Multiplexed Passive Optical Network (MDM-PON) apparatus, the method comprising:
    at one optical network unit (ONU) after another, sequentially transmitting upstream optical signals regardless of time;
    at a non-mode selective multiplexer, coupling the sequentially received upstream optical signals, wherein the non-mode selective multiplexer is configured to comprise a first end where three or more single-mode optical fibers are spaced apart from each other by a predetermined distance, and a second end where cores of the three or more single-mode optical fibers are tapered such that a gap between the three or more single-mode optical fibers is narrower than the predetermined distance while the three or more single-mode optical fibers are spaced apart from each other by an equal distance, and wherein the non-mode selective multiplexer outputs, to the second end, an optical signal mode generated by coupling optical signals received at the first end, splits the optical signals received at the second end into a number of the single-mode optical fibers, and outputs the split optical signals to the first end;
at the non-mode selective multiplexer, transmitting the coupled upstream optical signals to an optical line terminal (OLT) through a few-mode optical fiber; and
at the OLT, receiving the optical signals by mode multiplexing and digital signal processing.

* * * * *